United States Patent
Raje et al.

(10) Patent No.: US 12,220,953 B2
(45) Date of Patent: Feb. 11, 2025

(54) TIRE TREAD BAND WITH SHIM LAYERS

(71) Applicant: Bridgestone Americas Tire Operations, LLC, Nashville, TN (US)

(72) Inventors: Nihar N. Raje, Nashville, TN (US); Bradley S. Plotner, Canton, OH (US); Benjamin E. Rimai, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 525 days.

(21) Appl. No.: 17/417,887

(22) PCT Filed: Jan. 3, 2020

(86) PCT No.: PCT/US2020/012157
§ 371 (c)(1),
(2) Date: Jun. 24, 2021

(87) PCT Pub. No.: WO2020/142670
PCT Pub. Date: Jul. 9, 2020

(65) Prior Publication Data
US 2022/0072908 A1    Mar. 10, 2022

Related U.S. Application Data

(60) Provisional application No. 62/788,692, filed on Jan. 4, 2019.

(51) Int. Cl.
*B60C 7/14* (2006.01)
*B60C 7/18* (2006.01)
(Continued)

(52) U.S. Cl.
CPC ............... *B60C 7/146* (2021.08); *B60C 7/22* (2013.01); *B60C 9/2006* (2013.01)

(58) Field of Classification Search
CPC .... B60C 7/00; B60C 7/08; B60C 7/14; B60C 7/146; B60C 7/18; B60C 7/22
See application file for complete search history.

(56) References Cited

U.S. PATENT DOCUMENTS 6,142,203 A    11/2000  Bickford
7,201,194 B2 *  4/2007  Rhyne ..................... B60C 7/10
                                                    152/5

(Continued)

FOREIGN PATENT DOCUMENTS

| EP | 1420964 | * 11/2007 |
| FR | 3067655 | 12/2018 |

(Continued)

OTHER PUBLICATIONS

Supplementary European Search Report; Corresponding EP Application No. 20735986; Sep. 5, 2022.

(Continued)

*Primary Examiner* — Justin R Fischer
(74) *Attorney, Agent, or Firm* — Shaun J. Fox; Bryan J. Jaketic

(57) ABSTRACT

A non-pneumatic tire includes an inner ring having an axis of rotation and an outer ring coaxial with the inner ring. The non-pneumatic tire further includes support structure extending from the inner ring to the outer ring and a circumferential tread extending about the outer ring. The circumferential tread includes a shear element. The shear element includes a lower shim layer of solid material, an upper shim layer of solid material, and an elastic layer disposed between the lower shim layer and the upper shim layer. The elastic layer has a higher elasticity than the lower shim layer and the upper shim layer.

8 Claims, 3 Drawing Sheets

(51) Int. Cl.
*B60C 7/22* (2006.01)
*B60C 9/20* (2006.01)

(56) References Cited

U.S. PATENT DOCUMENTS

| | | | |
|---|---|---|---|
| 8,991,455 B2* | 3/2015 | Cron | B60C 7/107 |
| | | | 152/324 |
| 11,390,124 B2* | 7/2022 | Bohn | B60C 7/18 |
| 2004/0159385 A1 | 8/2004 | Rhyne | |
| 2010/0018621 A1 | 1/2010 | Thompsom | |
| 2012/0216932 A1 | 8/2012 | Cron | |
| 2012/0241062 A1 | 9/2012 | Manesh et al. | |
| 2017/0057288 A1 | 3/2017 | Sugiya et al. | |
| 2017/0113488 A1 | 4/2017 | Iwamura et al. | |
| 2017/0120681 A1* | 5/2017 | Toyosawa | B60C 11/00 |
| 2018/0029422 A1 | 2/2018 | Thompson | |
| 2018/0326787 A1 | 11/2018 | Pannikottu et al. | |
| 2018/0345718 A1 | 12/2018 | Delfino | |

FOREIGN PATENT DOCUMENTS

| | | |
|---|---|---|
| JP | 05-024407 | 2/1993 |
| JP | 2005-500932 | 1/2005 |
| JP | 2013507296 | 3/2013 |
| JP | 2017105450 | 6/2017 |
| JP | 2018058541 | 4/2018 |
| WO | 2014188912 | 11/2014 |
| WO | 2015194087 | 12/2015 |
| WO | 2018170583 | 9/2018 |

OTHER PUBLICATIONS

International Search Report and Written Opinion; Corresponding PCT Application No. PCT/US2020/012157; Authorized Officer Chan Yoon Hwang; Apr. 27, 2020.

* cited by examiner ial or metal.

TIRE TREAD BAND WITH SHIM LAYERS

FIELD OF INVENTION

The present disclosure relates to a tire tread band, and a method of making the same. More particularly, the present disclosure relates to a tire band with shim layers and a method of making the same.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring. In some non-pneumatic tires, a circumferential tread may be wrapped about the outer ring of the tire.

The circumferential tread may contain a shear element having an elastic region disposed between upper and lower inelastic regions. The shear element may also be referred to as a shear band, a tread band, or a thin annular high strength band element. When used in a pneumatic tire, the shear element acts as a tension member when the tire is pressurized. When used in a non-pneumatic tire, or a pneumatic tire in an unpressurized or partially pressurized state, the shear element acts as a structural compression member.

SUMMARY OF THE INVENTION

In one embodiment, a non-pneumatic tire includes an inner ring having an axis of rotation and an outer ring coaxial with the inner ring. The non-pneumatic tire further includes support structure extending from the inner ring to the outer ring and a circumferential tread extending about the outer ring. The circumferential tread includes a shear element. The shear element includes a lower shim layer of solid material, an upper shim layer of solid material, and an elastic layer disposed between the lower shim layer and the upper shim layer. The elastic layer has a higher elasticity than the lower shim layer and the upper shim layer.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
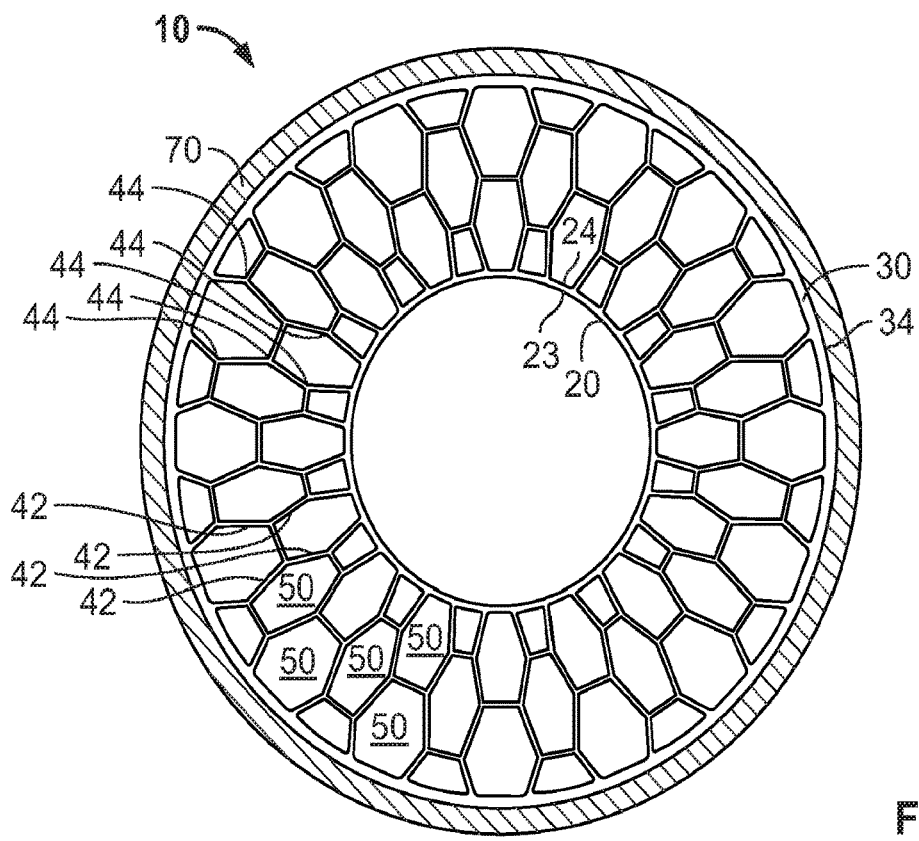
FIG. 1 is a side view of an undeformed non-pneumatic tire.
Figure 2:
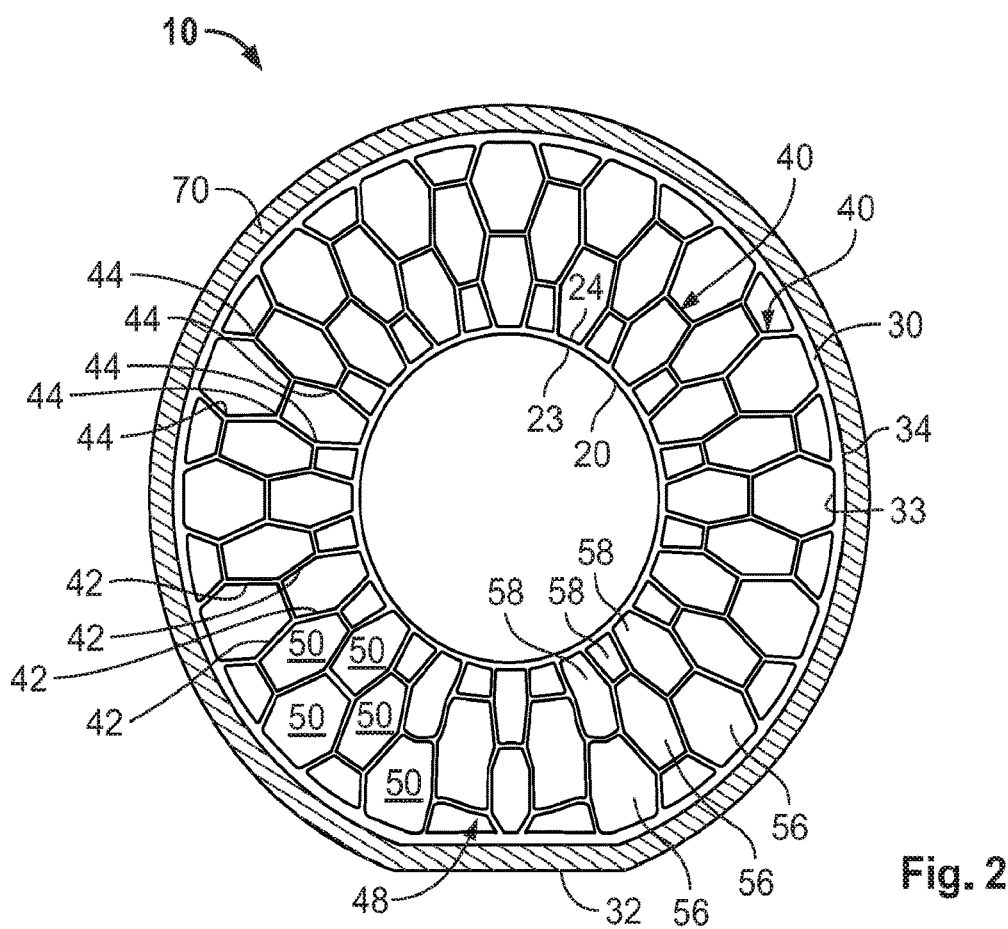
FIG. 2 is a side view of the non-pneumatic tire of FIG. 1 being deformed when subjected to a load.

FIGS. 1 and 2 illustrate one embodiment of a non-pneumatic tire 10. The non-pneumatic tire 10 is merely an exemplary illustration and is not intended to be limiting. In the illustrated embodiment, the non-pneumatic tire 10 includes a generally annular inner ring 20 that engages a rim (not shown) to which the tire 10 is mounted. The generally annular inner ring 20 has an internal surface 23 and an external surface 24 and can be made of an elastomeric material or metal.

The non-pneumatic tire 10 further includes a generally annular outer ring 30 surrounding an interconnected web 40, which is a support structure connected to the generally annular inner ring 20. In alternative embodiments, a plurality of spokes or other support structure connects the inner ring to the outer ring. The outer ring 30 can be configured to deform in an area 48 around and including a footprint region 32 (see FIG. 2), which decreases vibration and increases ride comfort.

In one embodiment, the generally annular inner ring 20 and the generally annular outer ring 30 are made of the same material as interconnected web 40. In an alternative embodiment, at least one of the generally annular inner ring, the generally annular outer ring, and the interconnected web are made of a different material. As shown in FIG. 1, the generally annular outer ring 30 can have a radially external surface 34 to which a tread carrying layer 70 is attached. Attachment can be done adhesively or using other methods commonly available in the art.

In the illustrated embodiment, the interconnected web 40 has at least two radially adjacent layers 56, 58 of web elements 42 that define a plurality of generally polygonal openings 50. In other embodiments (not shown), other web configurations may be employed. In another embodiment (not shown), spokes or other support structure may be employed instead of a web.

Figure 3:
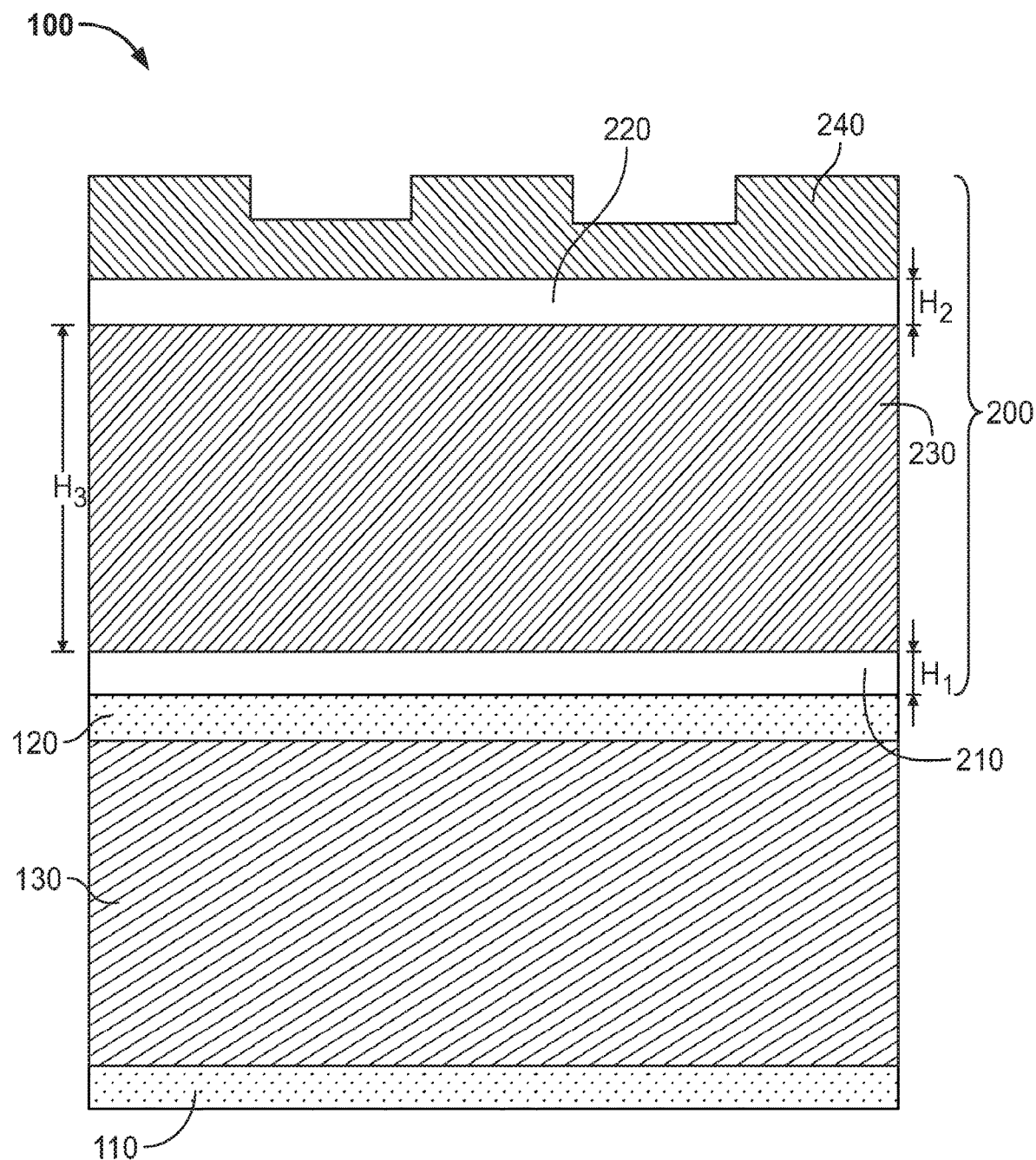
FIG. 3 is a schematic drawing illustrating a partial cross-section of one embodiment of a non-pneumatic tire.

FIG. 3 is a schematic drawing illustrating a partial cross-section of one embodiment of a non-pneumatic tire 100. In this embodiment, the non-pneumatic tire 100 includes a tire structure having an inner ring 110, an outer ring 120, and a support structure 130 extending from the inner ring to the outer ring. In one embodiment, the support structure 130 is a webbing, such as the webbing shown in FIGS. 1 and 2. In an alternative embodiment, the support structure includes a plurality of spokes. It should be understood, however, that any support structure may be employed.

The non-pneumatic tire 100 further includes a circumferential tread 200 having the same width as the outer ring 120. The circumferential tread 200 includes a shear element, which has a lower shim layer 210 of solid material, an upper shim layer 220 of solid material, and an elastic layer 230 disposed between the lower shim layer 210 and the upper shim layer 220. In one embodiment, the lower shim layer 210 and the upper shim layer 220 are constructed of the same material. In one specific embodiment, the lower shim layer 210 and the upper shim layer 220 are both constructed of steel, such as steel shim stock. In one specific embodiment, the lower shim layer 210 and the upper shim layer 220 are constructed of ultra high strength steel shim stock. Other exemplary materials include, without limitation, aluminum, brass, copper, stainless steel, polyester, and polyvinyl chloride (PVC). In all cases, the material may be shim stock material. In an alternative embodiment, the lower shim layer 210 and the upper shim layer 220 are constructed of different materials.

Favorable performance may be achieved with upper and lower shim layers constructed of a material having a high ultimate tensile strength and a surface finish with low surface roughness. In one embodiment, the upper and lower shim layers are constructed of a material having an ultimate tensile strength of at least 48,000 pounds of force per square inch (i.e., 48 ksi or 330 MPa). In another embodiment, the upper and lower shim layers are constructed of a material having an ultimate tensile strength of at least 96,000 pounds of force per square inch (i.e., 96 ksi or 660 MPa). In yet another embodiment, the upper and lower shim layers are constructed of a material having an ultimate tensile strength of at least 160,000 pounds of force per square inch (i.e., 160 ksi or 1100 MPa). A band layer constructed of a material having a high ultimate tensile strength has a better fatigue life.

Additionally, in one embodiment, the upper and lower shim layers are constructed of a material having an average surface roughness of less than 1000 micro inches (i.e., 25 microns). In another embodiment, the upper and lower shim layers are constructed of a material having an average surface roughness of less than 64 micro inches (i.e., 1.6 microns). In yet another embodiment, the upper and lower shim layers are constructed of a material having an average surface roughness of less than 32 micro inches (i.e., 0.8 microns). While a rougher finish may be better for adhesion, it has been found that a finer finish is better for fatigue life.

The ultimate tensile strengths and average surface roughnesses identified above may be found in high strength steel that has been prepared through a shot peening or laser shock peening process. The high strength steel may be specialty steel and may receive special heat treatment. Aluminum and titanium may also exhibit the ultimate tensile strengths and average surface roughnesses identified above.

The elastic layer 230 has a higher elasticity than the lower shim layer 210 and the upper shim layer 220. The elastic layer 230 also has high interlaminar shear strength. It may be desirable to construct the elastic layer 230 from a material with low hysteresis and high thermal conductivity to reduce heat buildup. Exemplary material for the elastic layer 230 includes, without limitation, rubber or thermoplastic.

In the illustrated embodiment, a layer of tread rubber 240 is disposed about the upper shim layer 220. The tread rubber 240 may have tread elements disposed therein. Exemplary tread elements include, without limitation, grooves, ribs, lugs, blocks, and sipes. The tread rubber 240 may be the same material as the elastic layer 230, or it may be a different material. The tread rubber 240 may be adhesively or chemically bonded to the upper shim layer 220.

In an alternative embodiment (not shown), the tread rubber surrounds the sides of the shear element, such that the shear element is embedded in the tread rubber. In another embodiment (not shown), the tread rubber surrounds the sides and the bottom of the shear element.

The lower shim layer 210 has a first height $H_1$, the upper shim layer 220 has a second height $H_2$, and the elastic layer 230 has a third height $H_3$. In one embodiment, the first height $H_1$ is equal to the second height $H_2$. In an alternative embodiment, the first height and second height are different. The third height $H_3$ is greater than the first height $H_1$ and the second height $H_2$. In one embodiment, $H_1$ and $H_2$ are each between 0.010 inches and 0.300 inches (0.254 mm to 7.62 mm). However, other arrangements may be employed.

The heights of the lower shim layer 210, the upper shim layer 220, and the elastic layer 230 may be selected to provide desirable performance of the non-pneumatic tire 100. For example, it may be desirable to increase the third height $H_3$ to regulate a bending moment about a neutral axis of the shear element to carry greater loads at greater deflections. It may also be desirable, however, to reduce the third height $H_3$ to decrease heat buildup that results from viscoelastic heat dissipation.

As another example, it may be desirable to reduce one or more of the first height $H_1$, second height $H_2$, and the third height $H_3$ to reduce the assembly weight. It may also be desirable, however, to increase the first height $H_1$ and the second height $H_2$ to reduce stress in the shim layers 210, 220. Decreasing the third height $H_3$ may also reduce stress in the shim layers 210, 220.

The thickness and stiffness of the tread rubber 240 may also be selected to regulate the footprint length.

It may be desirable to place the shim layers 210, 220 with the stiffest and least hysteretic material in the areas that carry the most load, far from the neutral axis of the shear element. The elastic layer 230 acts as a coupler between the shim layers 210, 220 and does not carry a majority of the load. This minimizes heat generation, temperature build up and rolling resistance. Use of a softer and hysteretic elastic layer 230 between the shim layers 210, 220 also helps in absorbing shock loading and provides some ride damping.

In one embodiment, the entire circumferential tread 200 is pre-formed including the tread rubber 240 and the shear element, including the shim layers 210, 220 and the elastic layer 230. The circumferential tread 200 is then attached to the outer ring 120 with an adhesive, by welding or brazing, or by a chemical bond, such as by heating the components to create a bond.

In an alternative embodiment, the circumferential tread 200 may be built layer by layer onto the outer ring 120. The building process would include placing the lower shim layer 210 about the outer ring 120, placing the elastic layer 230 about the lower shim layer 210, and placing the upper shim layer 220 about the elastic layer 230, and placing the tread rubber 240 about the upper shim layer 220. In one embodiment, the layers are attached to each other at each step, such as with an adhesive, by welding or brazing, or by a chemical bond, such as by heating the components to create a bond. In an alternative embodiment, the tire is heated after all of the layers are assembled, such that the layers bond to each other.

Figure 4:
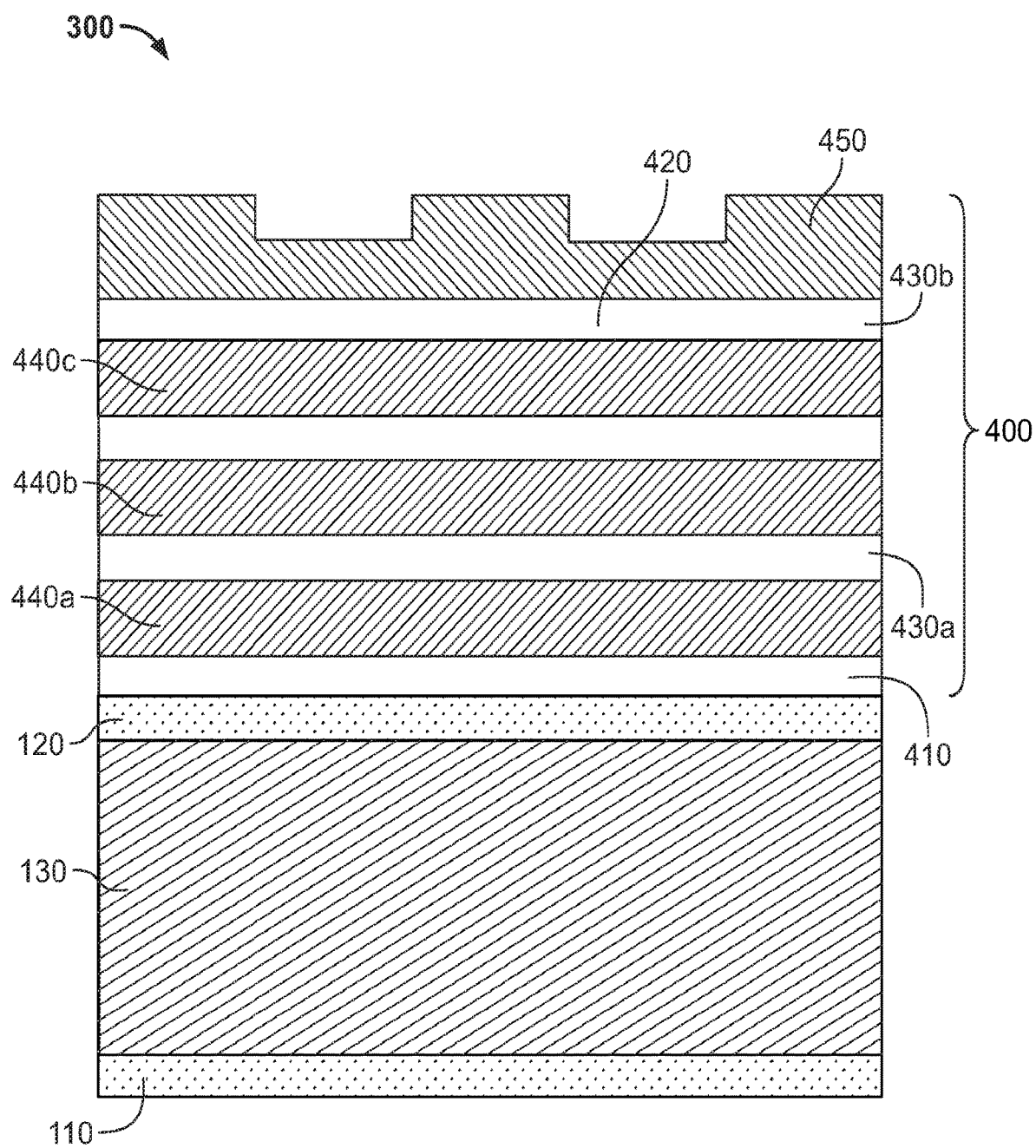
FIG. 4 is a schematic drawing illustrating a partial cross-section of an alternative embodiment of a non-pneumatic tire.

FIG. 4 is a schematic drawing illustrating a partial cross-section of an alternative embodiment of a non-pneumatic tire 300. In this embodiment, the non-pneumatic tire 300 also includes the inner ring 110, the outer ring 120, and the support structure 130 as described above with respect to FIG. 3. It should be understood, however, that any tire structure may be employed.

The non-pneumatic tire 300 further includes a circumferential tread 400 having the same width as the outer ring 120. The circumferential tread 400 includes a shear element, which has a lower shim layer 410 of solid material, an upper shim layer 420 of solid material. The shear element further includes a first middle shim layer 430a of solid material and a second middle shim layer 430b of solid material. The shear element also includes an elastic layer 440 disposed between the lower shim layer 410 and the upper shim layer 420. Here, the elastic layer has three components, including a lower elastic layer 440a disposed between the lower shim layer 410a and the first middle shim layer 430a, a middle elastic layer 440b disposed between the first middle shim layer 430a and the second middle shim layer 430b, and an upper elastic layer 440c disposed between the second middle shim layer 430b and the upper shim layer 420.

Each layer may be constructed of the same materials described above with respect to FIG. 3. Likewise, the height of each layer may be selected using the same considerations described above.

In the illustrated embodiment, a layer of tread rubber 450 is disposed about the upper shim layer 420. The tread rubber 450 may have tread elements disposed therein. Exemplary tread elements include grooves, ribs, lugs, blocks, and sipes. The tread rubber 450 may be the same material as the elastic layer 440, or it may be a different material. The tread rubber 450 may be adhesively or chemically bonded to the upper shim layer 220.

In an alternative embodiment (not shown), the tread rubber surrounds the sides of the shear element, such that the shear element is embedded in the tread rubber. In another embodiment (not shown), the tread rubber surrounds the sides and the bottom of the shear element.

The circumferential tread 400 may be constructed using one of the same methods described above with respect to FIG. 3.

In other alternative embodiments (not shown), the shear element may be constructed of six or more shim layers. While the shear elements have been described with respect to non-pneumatic tires, it should be understood that they may also be employed in pneumatic tires, such as run-flat pneumatic tires.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
   an inner ring having an axis of rotation;
   an outer ring coaxial with the inner ring;
   support structure extending from the inner ring to the outer ring; and
   a circumferential tread extending about the outer ring, the circumferential tread including a shear element,
      wherein the shear element includes a lower shim layer, the lower shim layer being a solid steel layer having a thickness between 0.010 inches and 0.300 inches,
      wherein the shear element includes an upper shim layer, the upper shim layer being a solid steel layer having a thickness between 0.010 inches and 0.300 inches,
      wherein the shear element includes an elastic layer disposed between the lower shim layer and the upper shim layer, the elastic layer having a higher elasticity than the lower shim layer and the upper shim layer, and
      wherein the shear element further includes a first middle shim layer and a second middle shim layer.

2. The non-pneumatic tire of claim 1, wherein the elastic layer includes:
   a lower elastic layer disposed between the lower shim layer and the first middle shim layer;
   a middle elastic layer disposed between the first middle shim layer and the second middle shim layer; and
   an upper elastic layer disposed between the second middle shim layer and the upper shim layer.

3. The non-pneumatic tire of claim 1, wherein each of the upper shim layer and the lower shim layer has an ultimate tensile strength of at least 330 MPa.

4. The non-pneumatic tire of claim 1, wherein each of the upper shim layer and the lower shim layer has an ultimate tensile strength of at least 660 MPa.

5. The non-pneumatic tire of claim 1, wherein each of the upper shim layer and the lower shim layer has an ultimate tensile strength of at least 1100 MPa.

6. The non-pneumatic tire of claim 1, wherein each of the upper shim layer and the lower shim layer has a surface with an average surface roughness of less than 25 microns.

7. The non-pneumatic tire of claim 1, wherein each of the upper shim layer and the lower shim layer has a surface with an average surface roughness of less than 1.6 microns.

8. The non-pneumatic tire of claim 1, wherein each of the upper shim layer and the lower shim layer has a surface with an average surface roughness of less than 0.8 microns.

* * * * *